… …

United States Patent [19]

Kawakami et al.

[11] Patent Number: 5,767,886
[45] Date of Patent: Jun. 16, 1998

[54] INK AMOUNT INDICATIVE SIGNAL CORRECTING APPARATUS FOR REDUCING DISPERSION DEGREE OF OVERLAPPING OF COLOR INKS FOR EACH PIXEL IN A COLOR IMAGE PRINTER SYSTEM

[75] Inventors: Haruko Kawakami; Hidekazu Sekizawa, both of Yokohama, Japan

[73] Assignee: Kabushiki Kaisha Toshiba, Kawasaki, Japan

[21] Appl. No.: 616,992

[22] Filed: Mar. 14, 1996

[30] Foreign Application Priority Data

Mar. 14, 1995 [JP] Japan .................................. 7-054195
Jul. 10, 1995 [JP] Japan .................................. 7-173244

[51] Int. Cl.$^6$ .......................... B41J 2/385; B41J 29/393; G03G 15/01; G01D 15/06
[52] U.S. Cl. ...................... 347/115; 347/19; 347/131; 347/246; 347/253
[58] Field of Search .......................... 347/115, 131, 347/19, 246, 236, 253, 15, 254, 43; 358/518

[56] References Cited

U.S. PATENT DOCUMENTS 4,803,496  2/1989  Kawakami et al. .................... 347/172
5,210,602  5/1993  Mintzer .................................. 358/518

FOREIGN PATENT DOCUMENTS 3-226180  10/1991  Japan .
4-2276    1/1992   Japan .
4-278779  10/1992  Japan .

Primary Examiner—Benjamin R. Fuller
Assistant Examiner—L. Anderson
Attorney, Agent, or Firm—Foley & Lardner

[57] ABSTRACT

An ink amount correction system is provided in a color image printer system for printing a full color image by mixing yellow, magenta, cyanogen and India ink amount signals. The ink amount correction system includes: a plurality of color ink amount correction circuits which include a quantization section for quantizing a color ink amount indicative signal representative of the amount of an ink of a predetermined color corresponding to each of picture elements of a primary color image; an error calculating section for calculating a quantization error between the input and output of the quantization section, to output as a quantization error signal; and a feedback correction section for adding the quantization error signal derived by the error calculating section, to the corresponding color ink amount indicative signal of the surrounding picture element, for correcting the ink amount indicative signal. The average value of the quantization error signal is added before the quantization of an ink amount indicative signal of a black ink having the maximum influence upon luminance. As a result, it is possible to reduce the dispersion of the degree of overlapping of inks for each of the picture elements to carry out the recording of good quality, in a case where a color image is printed by means of inks of a plurality of colors using error diffusion.

20 Claims, 6 Drawing Sheets

INK AMOUNT INDICATIVE SIGNAL
CORRECTING APPARATUS FOR REDUCING
DISPERSION DEGREE OF OVERLAPPING
OF COLOR INKS FOR EACH PIXEL IN A
COLOR IMAGE PRINTER SYSTEM

BACKGROUND OF THE INVENTION

The present invention relates generally to a color image printer system for printing a full color image using inks of a plurality of colors, and an ink amount indicative signal correcting apparatus provided therein. More specifically, this invention relates to an ink amount indicative signal correcting apparatus which is provided in a color image printer system for producing a print of good quality in the error diffusion method and which can reduce the dispersion of degree of overlapping of inks of a plurality of colors for each of a plurality of picture elements.

Most of printers for printing an image using ink is basically designed to produce a print by forming binary image points on the basis of the presence of the ink, but they can not express half-tone by changing the density of ink itself. For that reason, printers for expressing half-tone have used various methods for expressing pseudo gray scale by changing the ink adhered area by means of the density and size of image points or the combination thereof. Out of these various pseudo gray scale expressing methods, the dither method for expressing half-tone by means of the density of image points is one of typical methods. This dither method is often used since it can express relatively good half-tone. However, since the dither method causes one dot of image point on a printed image to correspond to one picture element of an primary image for expressing half-tone by means of the density of a plurality of image points, there is a problem in that the resolution in the printed image is damaged.

Therefore, the error diffusion method has been proposed as a method which develops the dither method and which can express half-tone without the great reduction of resolution. In the error diffusion method, in order to minimize a quantization error for quantizing an input signal, a quantization error produced in the past picture element before a picture element to be noticed in the input signal is used as a coefficient to weight the picture elements surrounding the noticed picture element in the input signal with the coefficient. In a printer using ink, the input signal is an ink amount indicative signal which is representative of the amount of ink corresponding to the primary picture element, and the ink amount indicative signal corrected by the error diffusion method is supplied to an image output section.

In a case where the error diffusion method is simply applied to a multicolor printer, specifically to a color printer for printing a color image of half-tone by inks of three or four colors, the ink amount indicative signals of the respective colors serving as input signals are individually quantized regardless of the quantization level of the other ink amount indicative signals of the other colors. That is, the error diffusion is independently carried out with respect to the respective ink amount indicative signals.

In this case, since there is no relationship between the conditions for supplying the respective color inks, the inks of a plurality of colors may be greatly overlapped or may not be overlapped. As a result, the degree of overlapping of inks of the respective colors for each of the picture elements varies widely. Therefore, the dispersion of the reproduced chromaticities for each of the picture elements, particularly the dispersion in the direction of luminance, is increased, or the rough feeling of an image and the rope-like pattern in a highlight portion are conspicuous, so that the deterioration of picture quality occurs. Such dispersion of chromaticities and the deterioration of picture quality have been main problems in the conventional systems.

This image is particularly conspicuous when inks of four colors containing India ink together with the under color removal (UCR) processing are used for printing a color image. That is, when a color image is printed by means of India ink and color inks including yellow, magenta and cyanogen inks, the "black" produced by greatly overlapping the inks of three colors including yellow, magenta and cyanogen on the printed color image and the "black" produced by the India ink are concentrated on a particular picture element, or no ink is adhered to the picture element to which ink is naturally to be adhered, due to the quantization error of the ink amount indicative signal in the error diffusion, so that the dispersion of luminance between the picture elements is increased. As a result, the picture quality of the color printed matter is remarkably deteriorated.

For example, Japanese Patent Laid-Open No. 4-2276 has proposed a method for increasing the number of quantization steps when quantizing an ink amount indicative signal in the error diffusion. However, in order to obtain a smooth half-tone image in this method, it is necessary for the output section of the color image to be able to express substantially in not less than 16 tones per one dot of the image, so that the deterioration of picture quality is conspicuous in a printer wherein the number of expressible tones is small.

As mentioned above, when the conventional error diffusion method is applied to a multicolor printer, the error diffusion processing is independently performed with respect to each of the ink amount indicative signals of the respective colors. Therefore, there is no relationship between the printing conditions of the inks of the respective colors, the degree of overlapping of inks of the respective colors for each of picture elements varies widely due to the quantization error in the error diffusion processing, so that the dispersion of the reproduced chromaticities for each of picture elements is increased to deteriorate the picture quality. In particular, when the printing of four colors using under color removal is carried out, there is a problem in that the deterioration of picture quality is conspicuous.

SUMMARY OF THE INVENTION

It is therefore a principal object of the present invention to eliminate the aforementioned problems, and to provide a color image printer system which can reduce the dispersion of degree of overlapping of inks of the respective colors for each of picture elements in a color portion having a great influence upon luminance on a screen when printing a color image by means of inks of a plurality of colors using the error dispersion, and which can print an image of good quality.

It is another object of the present invention to provide a color image printer system wherein the number of the mixed inks increases as the luminance of a color decreases, when a desired color is printed by mixing inks of a plurality of colors, and which can improve the quality of a four-color image by compensating the amount of India ink by sequentially using an ink amount indicative signal of a color having a great influence upon luminance, particularly in the case of UCR which substitutes India ink for "the black made by mixing inks of three colors".

In order to accomplish the aforementioned and other objects, a color image recording system of the present invention quantizes a plurality of ink amount indicative signals, each being representative of the amount of each of inks of a plurality of colors corresponding to a certain picture element on a primary color image, corrects an ink amount indicative signal by adding error signals representative of their quantization errors to the corresponding ink amount indicative signal of the picture elements surrounding the certain picture element, and records the color image by means of inks of the plurality of colors in accordance with the corrected ink amount indicative signal, characterized in that: an error signal obtained with respect to at least one ink amount indicative signal out of a plurality of ink amount indicative signals corresponding to the respective the picture elements is added to at least one of the other ink amount indicative signals corresponding to the same picture element.

That is, a color image recording system, according to the present invention, comprises; input means for inputting a plurality of ink amount indicative signals which are respectively representative of the amounts of inks of a plurality of colors corresponding to a primary color image; a plurality of quantization means for quantizing the plurality of ink amount indicative signals; a plurality of error calculating means for respectively deriving error signals representative of quantization errors of the signals quantized by the plurality of quantization means; a plurality of error propagation means for propagating the error signals derived by the plurality of error calculating means into the corresponding ink amount indicative signal; adding means for adding the error signal derived by the error calculating means with respect to at least one ink amount indicative signal other than an inputted ink amount indicative signal inputted to at least one of the plurality of quantization means, to the inputted ink amount indicative signal; and printing means for printing a color image by means of inks of a plurality of colors in accordance with the signals quantized by the plurality of quantization means.

In particular, when inputting a plurality of ink amount indicative signals which are respectively representative of the amounts of yellow, magenta, cyanogen and India inks as the plurality of ink amount indicative signals corresponding to the primary color image, in addition to the aforementioned basic construction, the system of the present invention comprises averaging means for deriving an average value of the error signals derived by the error calculating means with respect to the plurality of ink amount indicative signals, so that the average value is added to the ink amount indicative signal inputted to the quantization means for inputting the ink amount indicative signal which is representative of the amount of India ink out of the plurality of quantization means, to print a color image by yellow, magenta, cyanogen and India inks in accordance with the signals quantized by the plurality of quantization means.

In addition, according to the present invention, the error signal derived by the error calculating means with respect to the ink amount indicative signal which is representative of the amount of ink of a color having a smaller influence upon luminance than the color indicated by the ink amount indicative signal, may be added to the ink amount indicative signal inputted by the plurality of quantization means.

Moreover, to an ink amount indicative signal of a certain color inputted to the quantization means, a quantization error signal of another color may be added by the adding means arranged on the input side of the corresponding quantization means. The error calculating means may derive a differential signal between the ink amount indicative signal inputted to the adding means and the ink amount indicative signal quantized by the quantization means, as an error signal.

In this way, according to the present invention, an error signal representative of a quantization error of a certain ink amount indicative signal is added to another ink amount indicative signal, and the error signal is added to the another ink amount indicative signal before quantization (this means that the error signal is subtracted from the another ink amount indicative signal when a signal derived by subtracting an ink amount indicative signal before quantization from an ink amount indicative signal after quantization is used as the error signal, and that the error signal is added to the another ink amount indicative signal when a signal derived by subtracting an ink amount indicative signal after quantization from an ink amount indicative signal before quantization). Therefore, it is possible to prevent ink from concentrating only on a particular picture element in the color image of the output due to quantization error, so as to prevent the extreme dispersion of density for each of the image points. It is also possible to decrease the possibility of occurrence of a peculiar pattern which is easy to occur when the error diffusion processing are independently carried out with respect to the ink amount indicative signals of the respective colors. Therefore, it is possible to print a color image of good quality wherein the rough feeling is small.

In an apparatus for recording a color image using yellow, magenta, cyanogen and India inks together with the under color removal processing, the average value of error signals representative of quantization errors of ink amount indicative signals of yellow, magenta and cyanogen is added to the ink amount indicative signal of black before quantization (the same meaning as the foregoing), so that the amount of India ink is decreased when three color of inks, i.e. yellow, magenta and cyanogen inks, are greatly overlapped due to quantization error. In this way, it is possible to prevent black from concentrating on a particular picture element. On the other hand, it is also possible to prevent no inks from being attached to a picture element to which ink is naturally to be attached, by quantization error. Therefore, it is possible to print a good color image which has a small rough feeling between picture elements.

In addition, an error signal representative of quantization error of an ink amount indicative signal of a color having a smaller influence upon luminance than another color represented by another ink amount indicative signal before quantization way be added to the another ink amount indicative signal before quantization (the same meaning as the foregoing). In this way, it is also possible to compensate the dispersion of luminance between picture elements due to quantization error.

Moreover, when adding means for adding an error signal of quantization error of another ink amount indicative signal to another ink amount indicative signal before quantization is arranged on the input side of the corresponding quantization means to derive a differential signal between the ink amount indicative signal before quantization inputted to the adding means and the ink amount indicative signal after quantization, it is possible to compensate the macroscopic density of a primary image, i.e. the direct current component of an image. That is, an error signal representative of a quantization error of only the ink amount indicative signal of the corresponding color is used as the error signal added to the ink amount indicative signal of another picture element before quantization, so as to compensate the control amount of ink to maintain the characteristic of half-tone expression by the essential error diffusion method, whereby it is possible to express a good half-tone while improving the picture quality.

As mentioned above, according to the present invention, an error signal of quantization error when quantizing an ink amount indicative signal is added to an ink amount indicative signal of a color having a smaller influence upon luminance before a color having a greater influence thereon is quantized, so that it is possible to correct the degree of overlapping of inks to decrease the dispersion of degree of overlapping of inks for each of the picture elements. Therefore, it is possible to decrease the rough feeling of the recorded image which has been a problem in the conventional error diffusion method. It is also possible to print a good color image of a small deterioration in a printer such that the number of expressible tones per one picture element is small.

In particular, in the half-tone expression by the error diffusion method using inks of four colors together with UCR, it is possible to remove rope-like noise which is conspicuous at the portion wherein India ink is colored, and to obtain a color image of good quality.

In the case of a printer wherein the number of tones per one picture element is relatively great, for example, in the case of a printer of about 8 tones, the pattern peculiar to the error diffusion method is not usually conspicuous. On the other hand, for example, as an electrophotographic printer, when the second tone from highlight is first used since the first tone is unstable, the substantial number of tones at the portion of low density is decreased. Therefore, in the case of reproducing an image having much portions of a low density which are substantially the same level of highlight wherein Image points may be or may not be formed, the rope-like pattern of ink is remarkably conspicuous when the overlapping of inks for each of the picture elements is dispersed However:, according to the present invention, it is also possible to eliminate such a problem.

Moreover, while the present invention is particularly useful in an ink jet printer in which the possibility of occurence of the divergence between the positions of color inks and India ink is small, it is also possible to record a color image of good quality without producing the pattern peculiar to the error diffusion in an ink color of a high density even if it is easy to generate the divergence between the positions of the respective colors such as a laser printer.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings.

DETAILED DESCRIPTION OF THE PREFERRED EMBODIMENTS

Referring now to the accompanying drawings, the preferred embodiments of an ink amount indicative signal correction circuit in a color image printer system, according to the present invention, will be described in detail below.

Before the descriptions of the respective preferred embodiments, referring to FIG. 1, the schematic construction of a color image printer system in which an ink amount indicative signal correction circuit according to the present invention is provided, will be described below.

Figure 1:
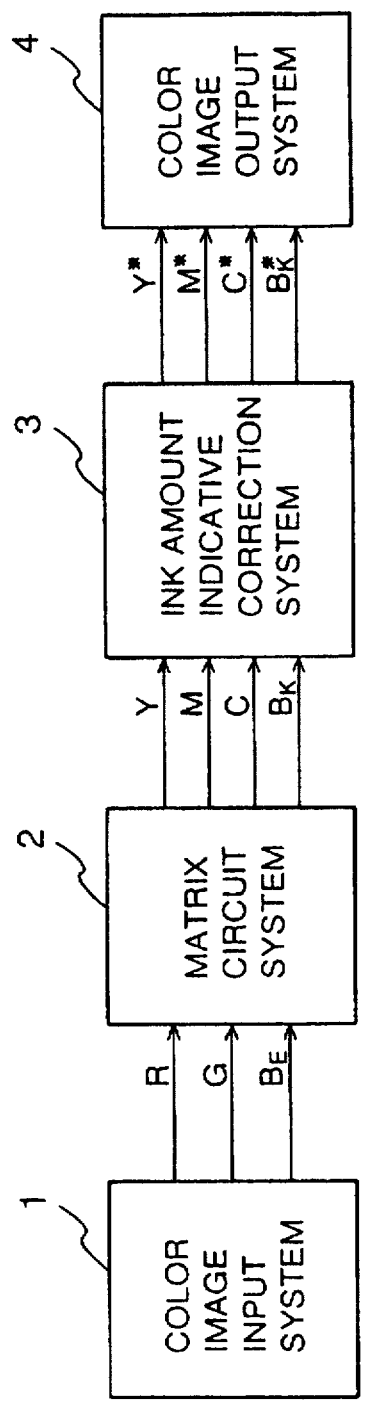
FIG. 1 is a block diagram which schematically shows the whole construction of a color image printer system, according to the present invention.

In FIG. 1, a color image printer system 5 comprises a color image input system 1, a matrix circuit system 2, an ink amount indicative correction system 3 and a color image output system 4. For example, the color image input system 1 comprises a color scanner which reads a color manuscript by raster scan, or a color image memory in which color image signals obtained by the raster scan have been stored. The color image input system 1 outputs color image signals R, G and BE of red, green and blue, respectively. The matrix circuit system 2 inputs these color image signals R, G and BE supplied from the color image input system 1, and converts them into input ink amount indicative signals Y, M, C and BK representative of the amounts of yellow, magenta, cyanogen and India inks by a well-known matrix operation using predetermined matrix coefficients. The ink amount indicative signal correction system 3 inputs the input ink amount indicative signals Y, M, C and $B_K$ supplied from the matrix circuit system 2, and produces output ink amount indicative signals Y*, M*, C* and $B_K$* by carrying out the error diffusion of the input ink amount indicative signals Y, M, C and $B_K$ for correcting them. These output ink amount indicative signals Y*, M*, C* and $B_K$* are inputted to the color image output system 4. The color image output system 4 comprises a printer which outputs a color image using yellow, magenta, cyanogen and India inks (containing toner), such as an ink jet printer or a laser printer. The color image output system 4 is driven by the output ink amount indicative signals Y*, M*, C* and $B_K$* supplied from the ink amount indicative signal correction system 3, and outputs a color image as a hard copy. Furthermore, in this printer system 1, yellow, magenta and cyanogen of absorbent medium are used as primary colors since the subtractive color mixing is used as the method for mixing a plurality of colors. Therefore, if the additive color mixing is used as the method for mixing colors, the primary colors are complementary colors thereof.

Now, referring to FIG. 2, the basic concept of an ink amount indicative signal correction system, according to the present invention, which is provided in the aforementioned color image printer system, will be described below.

Figure 2:
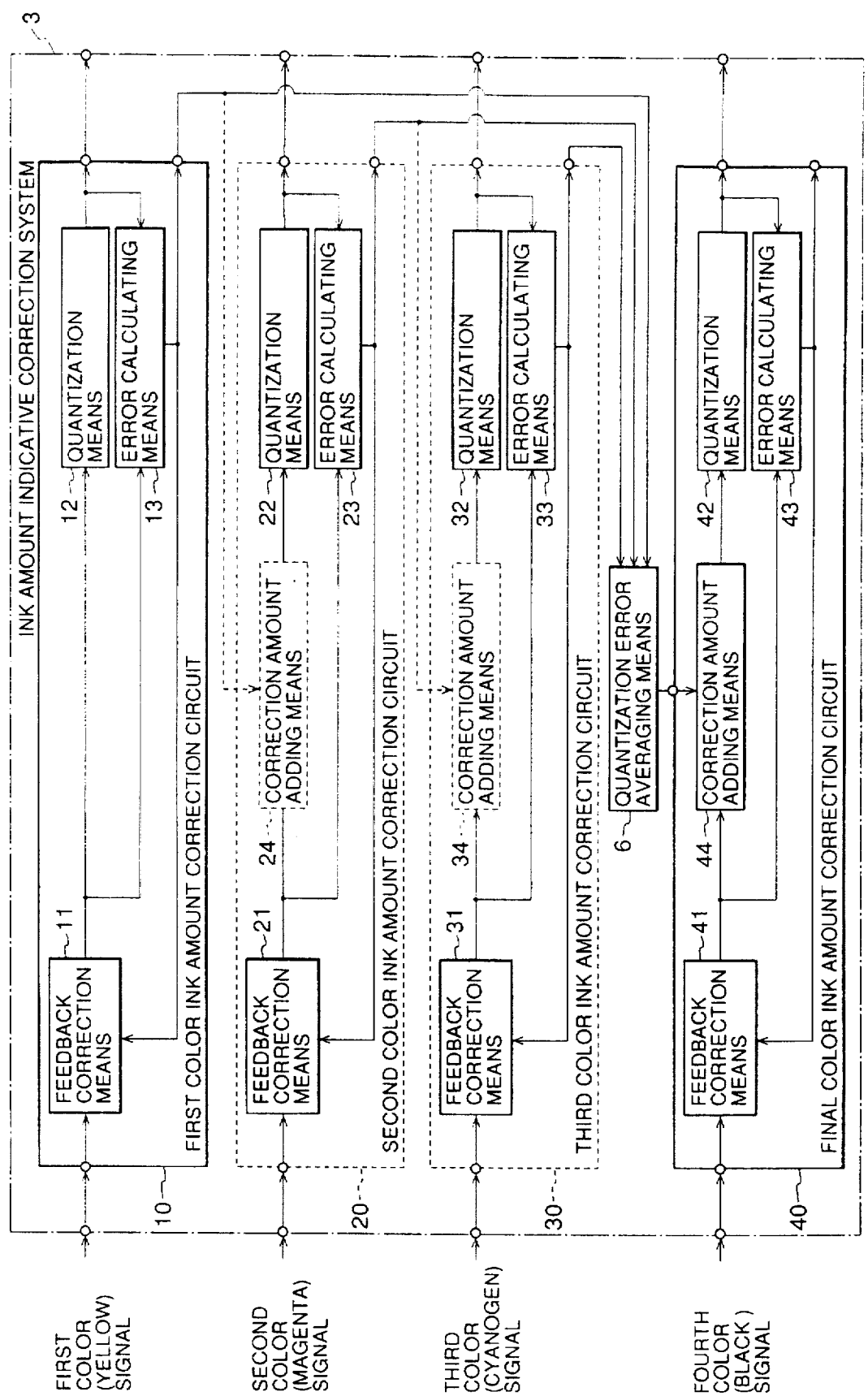
FIG. 2 is a block diagram which schematically shows the basic construction of a correction circuit for correcting an ink amount indicative signal in a color image printer system, according to the present invention.

In FIG. 2, the ink amount indicative correction system 3 comprises: a first color ink amount correction circuit 10 for correcting the amount of ink of a first color (for example, yellow) having the minimum influence upon luminance, on the basis of the quantization error of the circuit 10 itself and a weighting coefficient; a second color ink amount correction circuit 20 for correcting the amount of ink of a second color (for example, magenta) having the second smallest influence upon luminance, by adding a correction amount of the quantization error of the circuit 20 itself and/or the first color ink amount correction circuit 10 to the amount of ink of the second color; a third color ink amount correction circuit 30 for correcting the amount of ink of a third color (for example, cyanogen) having a relatively great influence upon luminance, by adding the quantization error of the circuit 30 itself and/or the second color ink amount correction circuit 20 to the amount of ink of the third color; and a final color ink amount correction circuit 40 for correcting the amount of ink of a fourth color (for example, black) having the maximum influence upon luminance, by adding correction amounts of the quantization errors of the circuit 40 itself and the first and/or second and third color ink amount correction circuits 10, 20 and 30 to the amount of ink of the fourth color. As the basic concept of the present invention, it is sufficient to provide a correction amount adding means for correcting the amount of ink of the fourth color while adding thereto the quantization error of the amount of ink of the first color. However, a quantization error averaging means 6 may also be provided when the average value of the quantization errors of the first, second and third color ink amount correction circuits 10, 20 and 30 for the respective primary colors, the mixture of which is black, is derived.

The first color ink amount correction circuit 10 comprises a feedback correction means 11 for inputting a first color (for example, yellow) signal to correct its color ink amount indicative signal by its quantization error to output a corrected color ink amount indicative signal; a quantization means 12 for quantizing the corrected color ink amount indicative signal; and an error calculating means 13 for calculating a difference (an error) between the color ink amount indicative signal outputted from the feedback correction means 11 and a quantization signal outputted from the quantization means 12.

The second color ink amount correction circuit 20 comprises a feedback correction means 21 for inputting a second color (for example, magenta) signal to correct its color ink amount indicative signal by its quantization error to output a corrected color ink amount indicative signal; a quantization means 22 for quantizing the corrected color ink amount indicative signal; an error calculating means 23 for calculating a difference (an error) between the color ink amount indicative signal outputted from the feedback correction means 21 and a quantization signal outputted from the quantization means 22; and, if desired, a correction amount adding means 24 for adding the error amount of the first color ink amount indicative signal as a correction amount from another color ink amount indicative signal to the color ink amount signal outputted from the feedback correction means, to output the correction amount.

The third color ink amount correction circuit 30 comprises a feedback correction means 31 for inputting a third color (for example, cyanogen) signal to correct its color ink amount indicative signal by its quantization error to output a corrected color ink amount indicative signal; a quantization means 32 for quantizing the corrected color ink amount indicative signal; an error calculating means 33 for calculating a difference (an error) between the color ink amount indicative signal outputted from the feedback correction means 31 and a quantization signal outputted from the quantization means 32; and, if desired, a correction amount adding means 34 for adding the error amount of the second color ink amount indicative signal as a correction amount from another color ink amount indicative signal to the color ink amount signal outputted from the feedback correction means, to output the correction amount.

The final color ink amount correction circuit 40 comprises a feedback correction means 41 for inputting a fourth color (for example, black) signal to correct its color ink amount indicative signal by its quantization error to output a corrected color ink amount indicative signal; a correction amount adding means 44 for adding the corrected error amount of the error calculating means 13 of the first color ink amount correction circuit 10 or the quantization error averaging means 6 to the output of the feedback correction means 41; a quantization means 42 for quantizing the output of the correction amount adding means 44; an error calculating means 43 for calculating a difference (a quantization error) between the output of the feedback correction means 41 and the output of the quantization means 42.

As can be clearly seen from the aforementioned constructions, the main feature of the ink amount correction circuit according to the present invention is that the correction amount adding means 44 for adding a quantization error of the amount of ink of a color having a relatively small influence upon luminance to a quantization error of the amount of ink of a color having a relatively great influence upon luminance is provided at least in a color ink amount correction circuit having a great influence upon luminance. If desired, a correction amount may also be accurately derived by supplying a quantization error of the amount of a color ink having the minimum influence upon luminance, to the correction amount adding means 24 or 34 provided upstream of the quantization means of the amount of a color ink, the influence upon luminance of which increases gradually. In addition, the quantization error of the first correction circuit 10 and the quantization errors of the second and third correction circuits 20 and 30 may be averaged by means of the quantization error averaging circuit 6 to supply the average value to the correction amount adding means 44 of the fourth correction circuit 40 as a correction amount.

Preferred embodiments of an ink amount correction circuit according to the present invention will be described in detail below.

Figure 3:
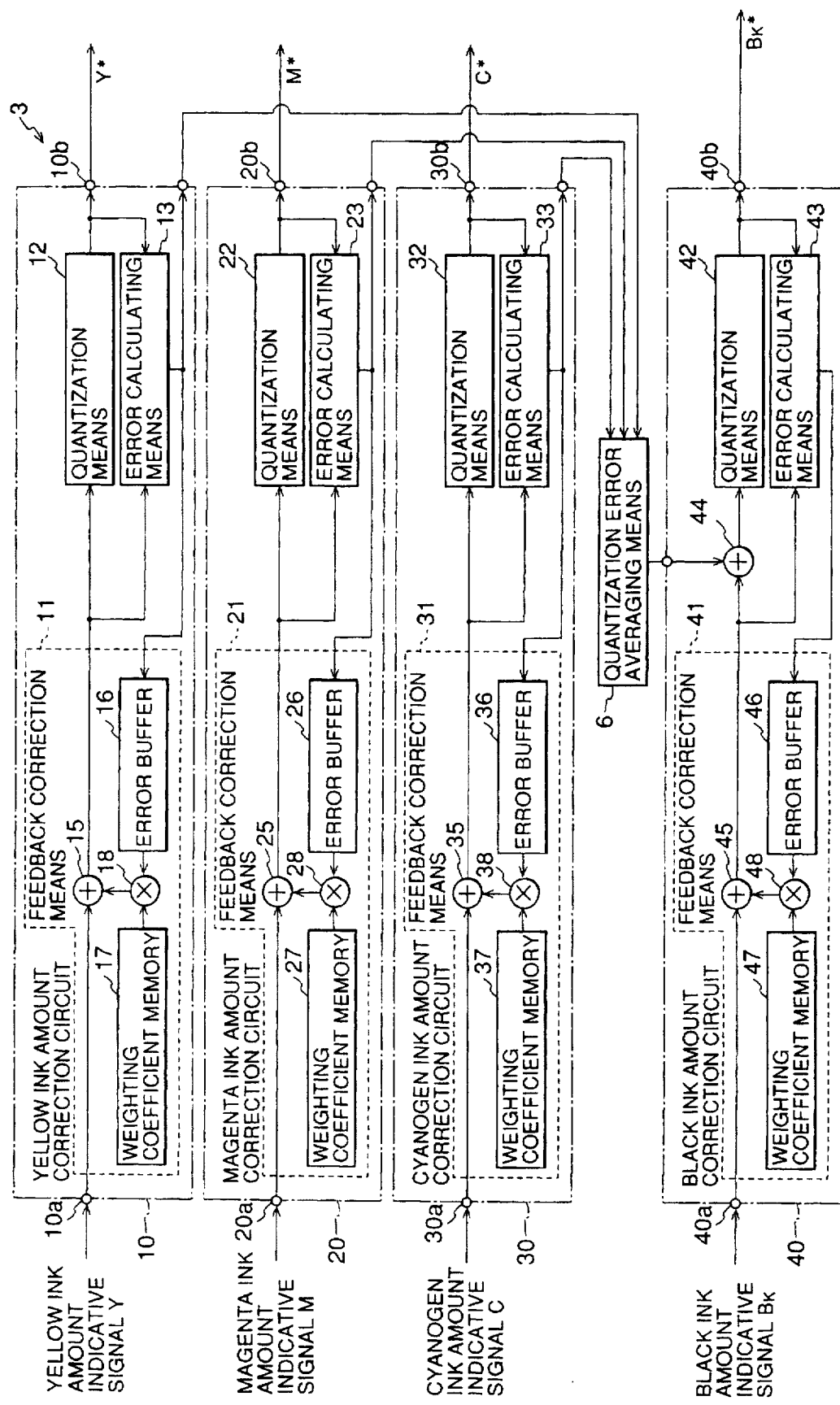
FIG. 3 is a block diagram of the first preferred embodiment of an ink amount indicative signal correction circuit, according to the present invention.

First, referring to FIG. 3, the first preferred embodiment of an ink amount indicative signal correction circuit according to the present invention will be described in detail. As shown in FIG. 3, the first preferred embodiment of an ink amount indicative signal correction circuit 3, according to the present invention, comprises a yellow ink amount correction circuit 10, a magenta ink amount correction circuit 20, a cyanogen ink amount correction circuit 30 and a black ink amount correction circuit 40 which respectively have input terminals 10a, 20a, 30a and 40a for respectively inputting input ink amount indicative signals Y, M, C and B, from the matrix circuit 2 of FIG. 1. These input ink amount indicative signals Y, M, C and $B_K$ are inputted to quantization circuits 12, 22, 32 and 42 via adders 15, 25, 35 and 45, respectively, and are quantized in a proper number of quantization steps to generate output ink amount indicative signals Y*, M*, C* and $B_K$* which are outputted to the color image output section 4 of FIG. 1.

The error calculating circuits 13, 23, 33 and 43 derive the difference between the input and output of the quantization circuits 12, 22, 32 and 42, to detect the quantization errors for outputting error signals. These error signals are written in one line of memory of each of error buffers 16, 26, 36 and 46 comprising two line memories for storing error signal data of two lines, and are read out of the other line memory of each of the error buffers to be inputted to multipliers 18, 28, 38 and 48, respectively. In the multipliers 18, 28, 38 and 48, the input error signals are multiplied by weighting coefficient matrices supplied from weighting coefficient memories 17, 27, 37 and 47. The respective error signals multiplied by the weighting coefficient matrices are added to the input ink amount indicative signals Y, M, C and BK by means of the adders 15, 25, 35 and 45, respectively, to be added to picture elements surrounding a picture element to be noticed, so as to carry out error diffusion.

Furthermore, the feedback correction means 11 comprises the adder 15, the error buffer 16, the weighting coefficient memory 17 and the multiplier 18, and the feedback correction means 21 comprises the adder 25, the error buffer 26, the weighting coefficient memory 27 and the multiplier 28. Similarly, the feedback correction means 31 comprises the adder 35, the error buffer 36, the weighting coefficient memory 37 and the multiplier 38, and the feedback correction means 41 comprises the adder 45, the error buffer 46, the weighting coefficient memory 47 and the multiplier 48. Furthermore, the reference number 44 denotes an adder which serves as a correction amount adding means provided in the black ink amount correction circuit 40 and which adds the output of the quantization error averaging circuit 6 to the output of the adder 45.

Figure 4:
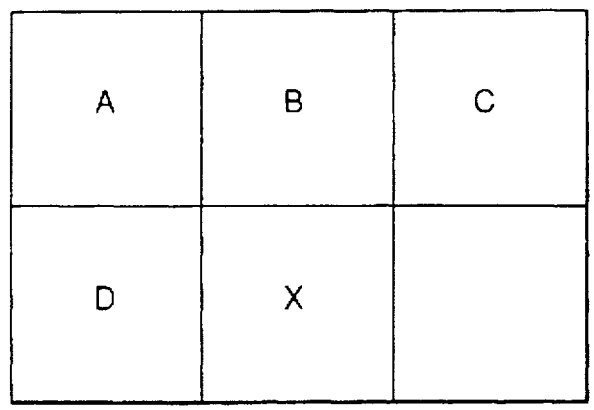
FIG. 4 is a view showing an example of a matrix of weighting coefficients used in the error diffusion.

Now, the error diffusion in the first preferred embodiment of the ink amount indicative signal correction system 3, according to the present invention, will be described in detail. The weighting coefficient matrix has four picture elements as shown in FIG. 4, for example. The coefficients PA, PB, PC and PD which are set in the picture elements surrounding a picture element to be noticed are, for example, $1/16$, $5/16$, $3/16$ and $7/16$, respectively. PX is the picture element to be noticed, to which the coefficient PA, PB, PC and PD are applied.

For example, in the case of the error diffusion to the input ink amount indicative signal Y of yellow, out of the input ink amount indicative signals Y, M, C and $B_K$, an error signal Em-k, n-p produced in the past by (k,p) picture element from an input signal fmn inputted to the error diffusion processing section (in this case, the value of the picture element PX of the input ink amount indicative signal Y) is multiplied by the weighting coefficient matrix of the coefficient αk,p supplied from the weighting coefficient memory 17, wherein k is the position of the picture element in the main scan direction, p being the position of the picture element in the auxiliary scan direction. The weighted error signal is added to the input signal fmn by the adder 15 to derive the next correction value f*mn which is quantized by the quantization circuit 12. In this case, the correction value f*mn can be expressed by the following formula (1).

$$f^*mn = fmn + \{1/\Sigma\alpha k,p\} \Sigma\alpha k,p \, Em\text{-}k, n\text{-}p \quad (1)$$
$$k,p \quad k,p$$

The quantization error Emn is the difference (an error) between the correction value f*mn and the output signal Gmn of the quantization circuit 12, and can be expressed by the following formula (2).

$$Emn = f^*mn - Gmn \quad (2)$$

Moreover, the error diffusions for the input ink amount indicative signals M and C of magenta and cyanogen, out of the input ink amount indicative signal Y, M, C and $B_K$, are carried out by means of the quantization circuits 22 and 32, the error calculating circuits 23 and 33, the error buffers 24 and 34, the weighting coefficient memories 27 and 37, the adders 28 and 38 and the adders 25 and 35, in a similar manner to the error diffusion processing with respect to the input ink amount indicative signal Y of yellow.

The error diffusion processing with respect to the aforementioned input ink amount indicative signals Y, M and C are the same as the conventional error diffusion processing. This first preferred embodiment of an ink amount indicative signal correction system is characterized in that the quantization errors when the error diffusions for these input ink amount indicative signals Y, M and C are carried out are caused to reflect the input ink amount indicative signal $B_K$ of India ink.

That is, the error signals representative of the quantization errors at the quantization circuits 12, 22 and 32 obtained by the error calculating circuits 13, 23 and 33 are inputted to the error buffers 16, 26 and 36 and the averaging circuit 6, to calculate an average value of three error signals. In this case, the adder 44 is arranged on the input side of the quantization circuit 42 corresponding to the input ink amount indicative signal $B_K$ of India ink. This adder 44 adds the output of the averaging circuit 6 to the output of the adder 45 to input the added output to the quantization circuit 42.

In addition, in this first preferred embodiment, the error calculating circuit 43 for deriving the quantization error of the quantization circuit 42 outputs, as an error signal, the difference between the ink amount indicative signal after error diffusion, which is inputted to the adder 44, and the quantized ink amount indicative signal outputted from the quantization circuit 42. In other words, the adder 44 is arranged in a detection loop for detecting the quantization error with respect to the quantization circuit 42. In this case, the correction value f**kmn of the black ink amount indicative signal $B_K$ inputted to the quantization circuit 42, i.e. the output of the adder 45, can be expressed by the following formula (3) on the basis of the value f*kmn after error diffusion supplied from the adder 45 with respect to the black ink amount indicative signal $B_K$, and on the basis of the quantization errors Eymn, Emmn and Ecmn in the error diffusion processing with respect to the ink amount indicative signals Y, M and C derived by the error calculating circuits 13, 23 and 33.

$$f^{**}kmn = f^*kmn + (Eymn + Emmn + Ecmn)/3 \quad (3)$$

The error signal representative of the quantization error derived by the error calculating circuit 43, i.e. the differential signal between the output f*kmn of the adder 45 and the output Gkmn of the quantization circuit 42, is inputted to the adder 48 via the error buffer 46. This error signal is multiplied by the weighting coefficient matrix supplied from the weighting coefficient memory 47, and then, added to the ink amount indicative signals of picture elements which surround the picture element of the input ink amount indicative signal BK by means of the adder 45.

As mentioned above, according to this first preferred embodiment, it is possible to reduce the dispersion between picture elements particularly in the luminance direction, by adding the error signals representative of the quantization errors of the ink amount indicative signals Y, M and C of color inks (yellow, magenta and cyanogen) before quantization, i.e. by adding the quantization errors of other ink amount indicative signal Y, M and C, for example, the correction values in the form of the average value of the error signals. Since human's visual characteristic is particularly sensitive to the movement in the luminance direction, it is possible to reduce the noise of the image only by means of this operation and to effectively improve the picture quality.

This advantageous effect will be described in detail. When a color image is recorded using inks of four colors including black ink, the "black" produced by the great degree of overlapping of three inks of yellow, magenta and cyanogen on the recorded color image and the "black" produced by the black ink may be concentrated on a particular picture element, due to the quantization errors with respect to the ink amount indicative signals. To the contrary, no inks may be adhered to a particular picture element. As a result, the dispersion of brightness between picture elements is increased.

On the other hand, in the picture elements wherein three inks of yellow, magenta and cyanogen are overlapped beyond the necessity due to the quantization error when the error signals representative of the quantization errors of the ink amount indicative signals Y, M and C are added to the ink amount indicative signal $B_K$ of India ink before quantization as the first preferred embodiment, these error signals increase, for example, in the positive direction, so that it is possible to reduce the ink amount indicative signal of India ink before quantization. To the contrary, in picture elements to which any inks of three colors of yellow, magenta and cyanogen are not adhered due to the quantization errors although color inks should be naturally adhered, the error signals representative of the quantization errors increase in the negative direction, so that the ink amount indicative signal of India ink increases before quantization. As a result, it is possible to reduce the dispersion of the condition of black between picture elements on the recorded color image, i.e. the dispersion of brightness.

In this way, in the first preferred embodiment, it is possible to prevent the occurrence of the noise pattern peculiar to error diffusion produced by the dispersion of degree of overlapping of inks between picture elements. It is also possible to print a color image of a small noise even in a printer which has a small number of expressible tones per one picture element. Moreover, this advantageous effect is particularly conspicuous in a color jet printer wherein is difficult to produce the divergence of the positions between color Inks and India ink. In addition, in a color image printer system which is easy to produce the divergence of the positions between inks of the respective colors as a laser printer, the pattern peculiar to error diffusion in the color of ink of high density is not produced. Therefore, it is possible to print a color image of good quality in any printers such as a color ink jet printer and a laser printer.

In addition, in the first preferred embodiment, the adder 44 for adding the error signals of the quantization errors of the ink amount indicative signals Y, M and C of yellow, magenta and cyanogen to the ink amount indicative signal $B_K$ of India ink before quantization is arranged on the input side of the quantization circuit 42 for the ink amount indicative signal $B_K$, and the differential signal between the ink amount indicative signal before quantization inputted to the adder 44 and the quantized ink amount indicative signal is derived as the error signal in the error calculating circuit 43, so that it is possible to express a good half-tone while improving the picture quality as mentioned above, without damaging the half-tone expression by the natural error method.

The second preferred embodiment of an ink amount indicative signal correction system according to the present invention will be described below.

In this second preferred embodiment, in order to decrease the capacity of a memory for storing the output ink amount indicative signals Y*, M*, C* and $B_K$* (for example, provided in the color image recording section 4) by the same construction as the aforementioned first preferred embodiment, it is possible to decrease the number of quantization steps of the ink amount indicative signal $B_K$ of India ink in the quantization circuit 42 so as to be less than the number of quantization steps of the ink amount indicative signals Y, M and C of color inks of yellow, magenta and cyanogen in the quantization circuits 12, 22 and 32, to carry out the error diffusion.

For example, it is assumed that the number of quantization steps of the ink amount indicative signals Y, M and C is "8", and the number of quantization steps of the ink amount indicative signal K is "5". It is also assumed in the error diffusion that the quantization is carried out after subtracting the average value of the error signals representative of the quantization errors of color inks immediately before quantization of the ink amount indicative signal $B_X$ of India ink, similar to the first preferred embodiment.

Generally, if the number of effective quantization steps of the ink amount indicative signals of all inks is "8", the pattern peculiar to error diffusion is visually conspicuous. To the contrary, if the number of quantization steps of the ink amount indicative signal K of India ink having a visually great influence to brightness is decreased, the pattern peculiar to error diffusion is remarkably conspicuous. However, when using the method for propagating the error signals representative of the quantization errors of the ink amount indicative signals Y, M and C to the ink amount indicative signal K of India ink before quantization as described in the first preferred embodiment, it is possible to decrease the deterioration of picture quality if the number of quantization steps of the ink amount indicative signal B., for example, to "5", and it is also possible to save the capacity of memory.

The third preferred embodiment of an ink amount indicative signal correction system in a color image printer system, according to the present invention, will be described below.

In the third preferred embodiment, the India-ink adding printing method like so-called skelton method wherein the rate of India ink is variable in the same construction as the first preferred embodiment, wherein the amount of India ink added to a chromatic color or a light color decreases, and wherein the amount of India ink added to a color near black increases, will be described.

First, the gray component GR of the color image signal inputted from the color image input section 1 of FIG. 1 is derived, for example, from the minimum value of the ink amount indicative signals Y, M and C as shown in the following formula (4) or the product of the ink amount indicative signals Y, M and C as shown in the following formula (5).

$$GR = \min(Y, M, C) \quad (4)$$

$$GR = Y \times M \times C \quad (5)$$

Figure 5:
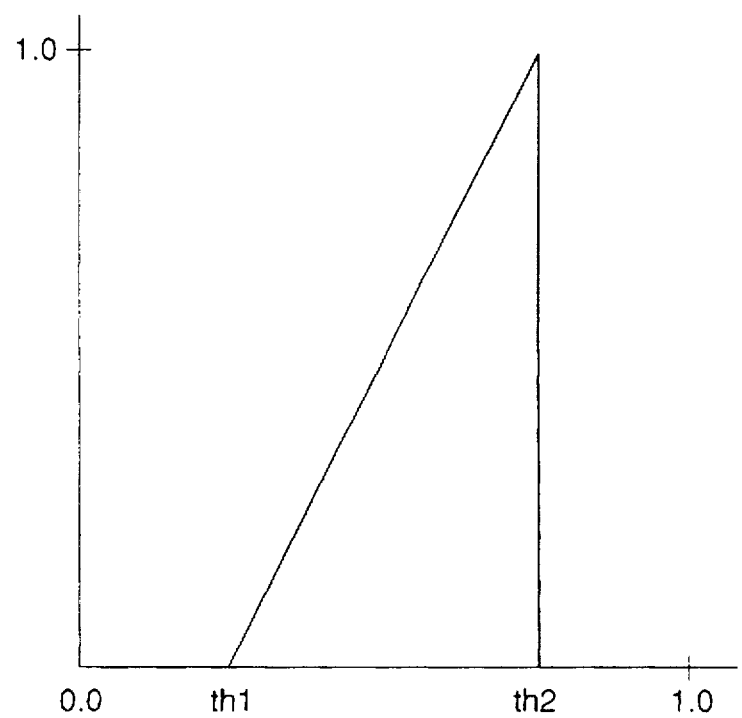
FIG. 5 is a graph showing the relationship between the minimum signal values and the India ink rate when the India ink rate is variable.

Next, the rate of India ink β representative of the amount of India ink added to the gray component GR is determined in accordance with the characteristic as shown in FIG. 5. As shown in FIG. 5, it is assumed that the rate of India ink β is fixed to 0 when the gray component GR is not greater than a predetermined threshold th1, it is 1 when the gray component GR is not less than another threshold th2, and it is β when the gray component GR is intermediate therebetween. This can be expressed by the following formulae.

$$\beta = 0 \quad (0 \leq GR < th1)$$

$$\beta = (GR - th1)/(th2 - th1) \quad (th1 \leq GR \leq th2) \quad (6)$$

$$\beta = 1 \quad (th2 < GR \leq 1)$$

In this way, the rate of India ink is switched so as to add India ink only to the necessary portion. Thereafter, the error diffusions with respect to the ink amount indicative signal $B_K$, of India ink and the other ink amount indicative signals Y, M and C are carried out by the same method as that of the first preferred embodiment. In this case, it is possible to reduce the pattern peculiar to the error diffusion, which is conspicuous in the error diffusion method wherein the usual rate of India ink is variable, and which is easy to occur in the switched portion of the rate of India ink, by carrying out the error diffusion processing as described in the first preferred embodiment, i.e the processing for adding the error signals representative of the quantization errors of the ink amount indicative signals Y, M and C to the ink amount indicative signal $B_K$ of India ink for quantization.

Figure 6:
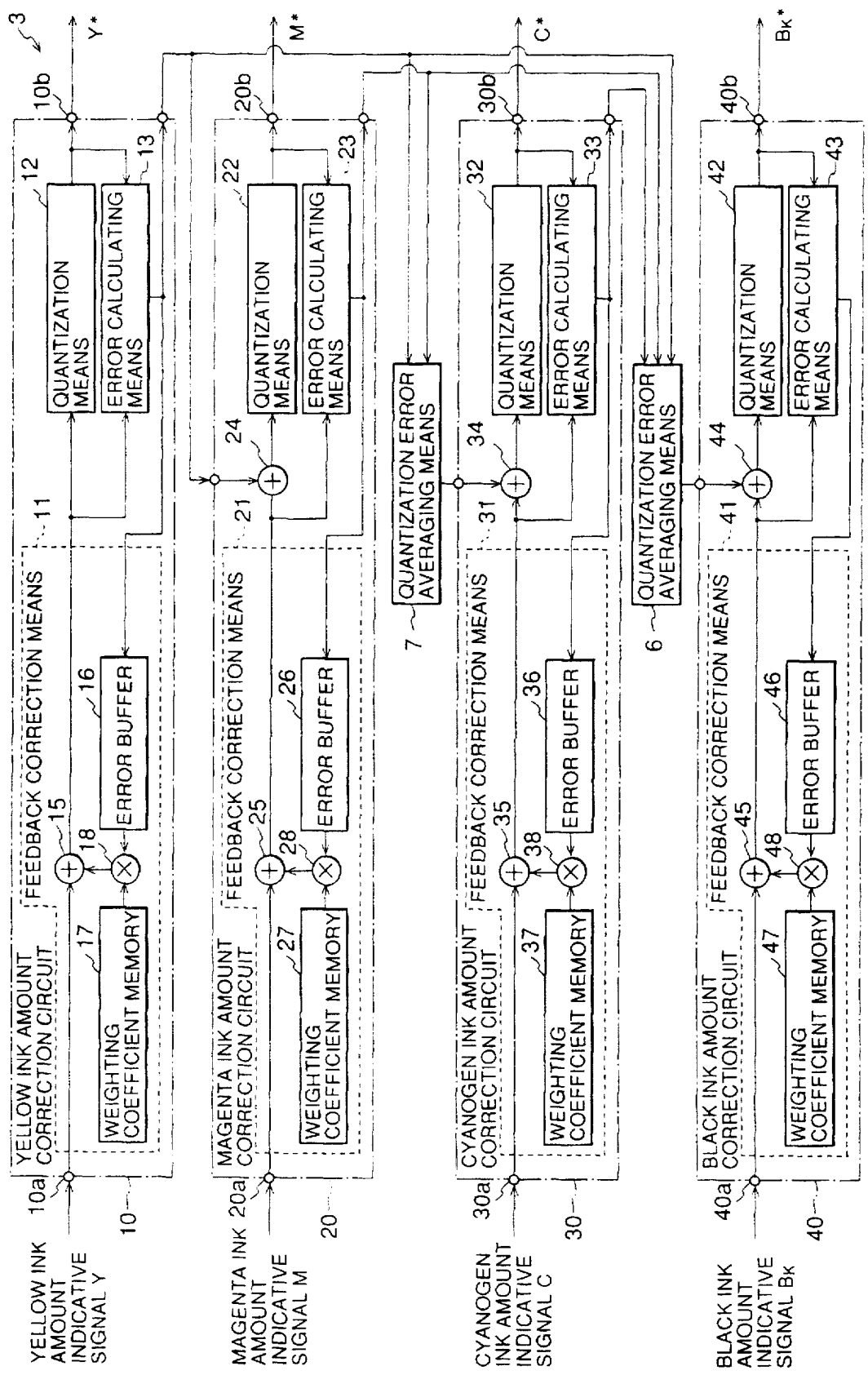
FIG. 6 is a block diagram of the fourth preferred embodiment of an ink amount indicative signal correction circuit, according to the present invention.

Referring to FIG. 6, the fourth preferred embodiment of the present invention will be described in detail. The fourth preferred embodiment is an example that the adding of the quantization error carried out only with respect to the ink amount indicative signal BK of India ink in the aforementioned first preferred embodiment is sequentially carried out with respect to the other ink amount indicative signals in order of from a color having a small influence on luminance to a color having a great influence thereon.

FIG. 6 is a block diagram showing the construction of the fourth preferred embodiment of an ink amount indicative signal correction system 3 according to the present invention. In the fourth preferred embodiment, the error signals corresponding to the ink amount indicative signals representative of the amounts of ink of colors having a smaller influence upon luminance than the colors represented by the ink amount indicative signals M, C and $B_K$ inputted to the quantization circuits 22, 32 and 42, i.e. the quantization error signals obtained by the error calculating circuits 13, 23 and 33, are added by the adders 24, 34 and 44, respectively. The influence upon luminance decreases in the order of cyanogen, magenta and yellow.

That is, in the fourth preferred embodiment, similar to the first preferred embodiment, with respect to the yellow ink amount indicative signal Y, the usual error diffusion is carried out by means of the adder 15, the quantization circuit 12, the error calculating circuit 13, the error buffer 16, the weighting coefficient memory 17 and the multiplier 18, regardless of the quantization errors of magenta, cyanogen and black ink amount indicative signals M, C and $B_K$.

On the input side for inputting the respective ink amount indicative signals of the quantization circuits 22, 32 and 42 for quantizing the other ink amount indicative signals M, C and $B_K$, the influence upon luminance of which increases gradually, adders 24, 34 and 44 are provided. To the adder 24, the error signal which is representative of the quantization error of the ink amount indicative signal Y and which is supplied from the error calculating circuit 13 is inputted via the terminal 20c. The quantization errors of the respective ink amount indicative signals Y and M of yellow and magenta are inputted to the quantization error averaging circuit 7 from the respective error calculating circuits 13 and 23. In this averaging circuit 7, the average values of both of the quantization errors are calculated to be supplied to the terminal 30c of the cyanogen ink amount correction circuit 30. The adder 34 adds the cyanogen ink amount indicative signal outputted from the adder 35, to the average value of the quantization error outputted from the averaging circuit 7, for outputting the added signal to the quantization circuit 32. The quantization errors of the respective colors of yellow, magenta and cyanogen outputted from the error calculating circuits 13, 23 and 33 are supplied to the quantization error averaging circuit 6 for calculating average values of the quantization errors of the respective colors. The calculated average values are supplied to the input terminal 40c of the black ink amount correction circuit 40. The adder 44 adds the black ink amount indicative signal $B_K$ supplied from the adder 45, to the average value of the quantization errors of the ink amount indicative signals Y, M and C supplied from the averaging circuit 6. In this case, the ink amount indicative signals (correction values fmmn, fcmn, f*kmn) inputted to the quantization circuits 22, 32 and 42 can be derived from the following formulas (7), (8) and (9), respectively.

$$f^{**}mmn = f^*mmn + Eymn \quad (7)$$

$$f^{**}cmn = f^*cmn + (Eymn + Emmn)/2 \quad (8)$$

$$f^{**}kmn = f^*kmn + (Eymn + Emmn + Ecmn)/3 \quad (9)$$

In this way, in the fourth preferred embodiment, in the quantization of the ink amount indicative signals of the respective inks, the processing for adding the error signals representative of the quantization errors of the ink amount indicative signals of the other inks having a smaller influence upon luminance is carried out. By carrying out such processing, it is possible to restrain the occurrence of pattern which is peculiar to error diffusion and which causes the deterioration of picture quality, without the concentration of ink only on a particular picture element, so that it is possible to record a color image of good quality.

In all the aforementioned first to fourth preferred embodiments, it has been described that the error diffusion is carried out using inks of four colors, i.e. yellow, magenta, cyanogen and black. However, the present invention is not limited to these preferred embodiments, and it is possible to accomplish the objects of the present invention by the fifth preferred embodiment wherein the error diffusion is carried out using inks of only three colors, i.e. yellow, magenta and cyanogen.

Figure 7:
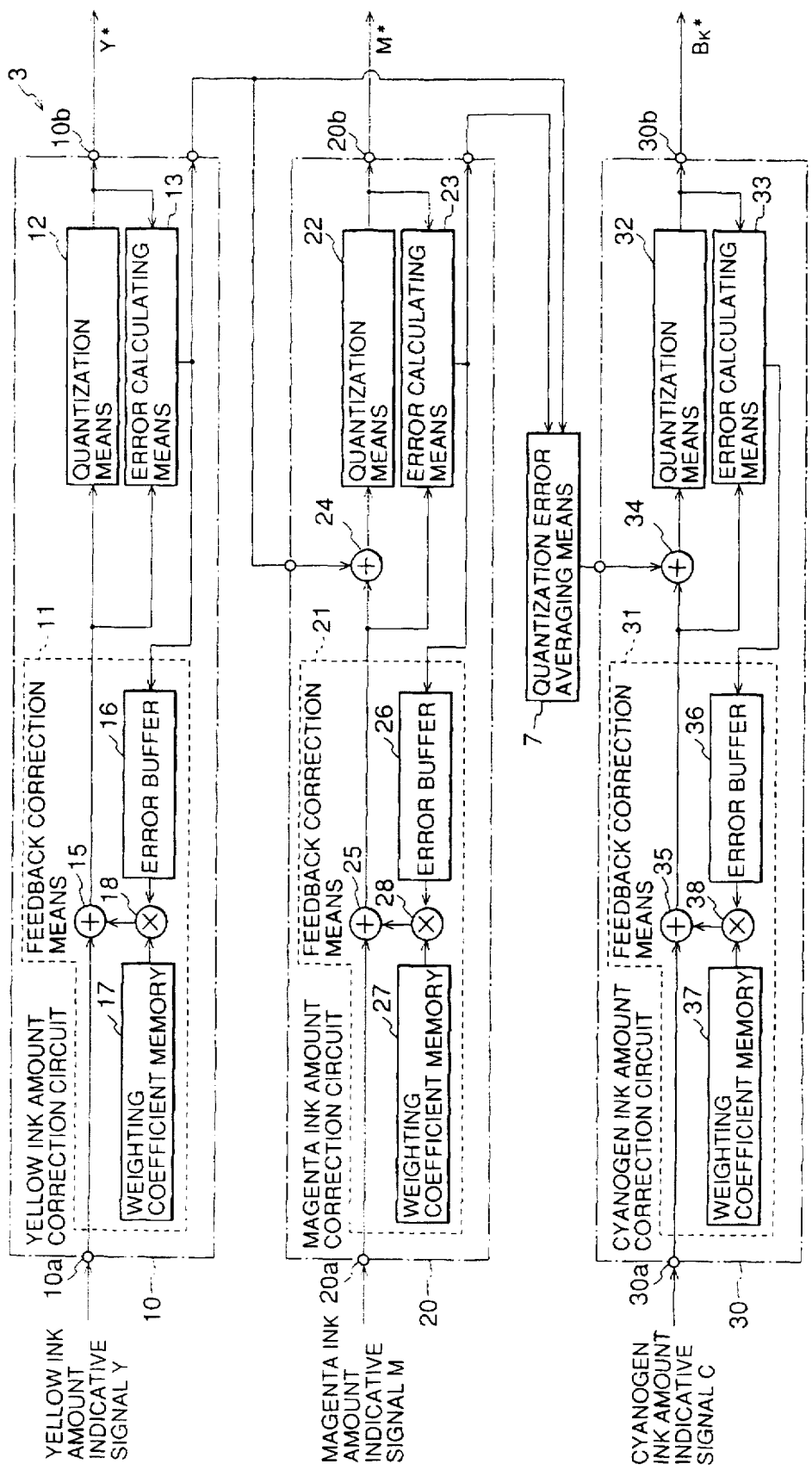
FIG. 7 is a block diagram of the fifth preferred embodiment of an ink amount indicative signal correction circuit, according to the present invention.

FIG. 7 is a block diagram showing the construction of the preferred embodiment of an ink amount indicative signal correction system 3, according to the present invention. As shown in FIG. 7, in the basic construction of the fifth preferred embodiment of the system, the black ink amount correction circuit 40 is removed from the correction system in the fourth preferred embodiment shown in FIG. 6. The procedure of the processing is the same as that in the fourth preferred embodiment, at the point that the ink amount indicative signals (correction values f**mmn, f*cmn) to which the error signals of the quantization errors are added by the formulae (7) and (8) are supplied to the quantization circuits 22 and 32.

In this way, the degree of overlapping of inks is adjusted by adding, to the ink amount indicative signals of inks of three colors, the error signals of the quantization error of the ink amount indicative signals of the other inks. Therefore, it is possible to decrease the dispersion of overlapping of inks between picture elements in comparison with the usual error diffusion, and to decrease the possibility that no inks are adhered, so that it is possible to record a color image of good quality in a printer of small expressive tones.

What is claimed is:

1. An ink amount indicative correction system provided in a color image printer system having a color image input system for generating color image signals corresponding to a primary image having a plurality of picture elements, a matrix circuit system for converting said color image signals into ink amount indicative signals, system for correcting said ink amount indicative signals, and a color image output system driven by said ink amount indicative signals after correction to output a color image, said ink amount indicative correction system comprising:

a plurality of color ink amount correction circuits, each including quantization means for quantizing a color ink amount indicative signal which is representative of an amount of ink of a predetermined color corresponding to each of said picture elements of said primary image;

error calculating means for calculating a quantization error between an input and an output of said quantization means, and for outputting a calculated quantization error as a quantization error signal; and feedback correction means for adding said quantization error signal calculated by said error calculating means to corresponding color ink amount indicative signals of surrounding picture elements; and correction amount adding means for inputting said quantization error signal calculated by said error calculating means in a first color ink amount correction circuit, said first color ink amount correction circuit for a color having a smaller influence upon luminance, and for adding said quantization error signal to a second color ink amount correction circuit, said second color ink amount correction circuit for a color having a greater influence upon luminance, wherein said correction amount adding means is provided in said second color ink amount correction circuit.

2. The system as set forth in claim 1, wherein:

said first color ink amount correction circuit includes:

first quantization means for quantizing a first color ink amount indicative signal having a substantially small influence upon luminance, with respect to a predetermined picture element;

first error calculating means for calculating a quantization error between an input ink amount indicative signal of said first quantization means and said color ink amount indicative signal quantized by said first quantization means, and for outputting a first quantization error signal; and first feedback correction means for correcting said first color ink amount indicative signal with respect to a picture element surrounding said predetermined picture element, using said first quantization error signal; and said second color ink amount correction circuit includes:

second quantization means for quantizing a second color ink amount indicative signal having a substantially greater influence upon luminance than said first color ink amount indicative signal;

second error calculating means for calculating a second quantization error between an input ink amount indicative signal of said second quantization means and said second color ink amount indicative signal quantized by said second quantization means, and for outputting a second quantization error signal with respect to a second ink; and second feedback correction means for correcting said second color ink amount indicative signal with respect to a picture element surrounding said predetermined picture element, using said second quantization error signal; and said correction amount adding means adding said first quantization error signal outputted from said first error calculating means, to said second color ink amount indicative signal outputted from said second feedback correction means.

3. The system as set forth in claim 2, wherein said first color ink amount correction circuit is a yellow ink amount correction circuit comprising said first feedback correction means for inputting a yellow ink amount indicative signal as said first color ink amount indicative signal which has substantially minimum influence upon luminance with respect to a certain picture element, and for correcting an amount of a yellow ink with respect to said certain picture element using said first quantization error signal with respect to the yellow ink, and wherein said second color ink amount correction circuit is a magenta ink amount correction circuit comprising:

said second feedback correction means for inputting a magenta ink amount indicative signal as said second color ink amount indicative signal having a substantially greater influence upon luminance than said yellow ink with respect to said certain picture element, for correcting the amount of a magenta ink with respect to said certain picture element using said second quantization error signal with respect to said magenta ink; and wherein said correction amount adding means adds the output of said second feedback correction means and said first quantization error signal with respect to said yellow ink, and supplies the added signal to said second quantization means.

4. A system as set forth in claim 3, which further comprises:

quantization error averaging means for deriving the average value of the values of said quantization error signal with respect to yellow outputted from said first error calculating means of said yellow ink amount correction circuit, and of said quantization error signal with respect to magenta outputted from said second error calculating means of said magenta ink amount correction circuit, to output a quantization error average-value signal; and a cyanogen ink amount correction circuit serving as a third ink amount correction circuit, including;

third feedback correction means for correcting the amount of cyanogen ink with respect to a picture element surrounding a certain picture element by means of a quantization error signal with respect to cyanogen ink; and second correction amount adding means, for adding said quantization error average-value signal outputted from said quantization error averaging means, to a cyanogen ink amount indicative signal outputted from said third feedback correction means.

5. The system as set forth in claim 2, wherein said first color ink amount correction circuit comprises a yellow ink amount correction circuit including said first feedback correction means for inputting a yellow ink amount indicative signal as said first color ink amount indicative signal having substantially minimum influence upon luminance with respect to a certain picture element, and for correcting the amount of a yellow ink with respect to a picture element surrounding said certain picture element using said first quantization error signal with respect to the yellow ink, and wherein said second color ink amount correction circuit serving as a black ink amount correction circuit comprises a third quantization circuit for inputting a black ink amount indicative signal as a third color ink amount indicative signal having substantially maximum influence upon luminance with respect to a certain picture element, and for quantizing said black ink amount indicative signal;

a third error calculating circuit for calculating a quantization error between an input and an output of said third quantization circuit for outputting a third quantization error signal;

third feedback correction means for correcting the amount of black ink with respect to a picture element surrounding said certain picture element using said third quantization error signal; and wherein said correction amount adding means adds the output of said third feedback correction means to said first quantization error signal with respect to yellow, and supplies the added signal to said third quantization circuit.

6. The system as set forth in claim 5, which further comprises:

a magenta ink amount correction circuit serving as said second color ink amount correction circuit wherein said second quantization means inputs a magenta ink amount indicative signal having a greater influence than yellow ink and smaller influence than black ink upon luminance with respect to a certain picture element, and quantizes an ink amount indicative signal with resect to magenta ink;

said second error calculating means calculates said second quantization error between the input and output of said second quantization means, and outputs said second quantization error signal with respect to the magenta ink;

said second feedback correction means corrects the amount of the magenta ink with respect to a picture element surrounding said certain picture element; and said correction amount adding means adds said first quantization error signal with respect to yellow ink outputted from said first error calculating means of said yellow ink amount correction circuit to the output of said second feedback correction means for outputting the added signal to said second quantization means;

first quantization error averaging means for deriving an average-value of the value of said first quantization error signal with respect to yellow ink outputted from said first error calculating means, and the value of said second quantization error signal with respect to magenta ink outputted from said second error calculating means, and for outputting an error average-value signal;

third means serving as a fourth color ink amount correction circuit, including:

fourth quantization means for inputting a cyanogen ink amount indicative signal having a greater influence than magenta ink and a smaller influence than black ink upon luminance with respect to a certain picture element;

fourth error calculating means for calculating a quantization error between the input and output of said fourth quantization means, and for outputting a fourth quantization error signal with respect to cyanogen ink; and fourth feedback correction means for correcting the amount of cyanogen ink with respect to a picture element surrounding said certain picture element using said fourth quantization error signal with respect to cyanogen ink; and second quantization error averaging means for deriving an average-value of the value of said first quantization error signal with respect to yellow ink outputted from said first error calculating means, the value of said second quantization error signal with respect to magenta ink outputted from said second error calculating means, and the value of said fourth quantization error signal with respect to cyanogen ink outputted from said fourth error calculating means, and for outputting an error average-value signal.

7. The system as set forth in claim 6, wherein each of said first, second, third and fourth feedback correction means comprises:

an error buffer for temporarily holding an error signal with respect to each of color inks supplied from error calculating means;

a weighting coefficient memory for storing a weighting coefficient having been derived for each of color in accordance with the respective color inks;

a multiplying circuit for multiplying the error signal hold in said error buffer, by said weighting coefficient which is stored in said weighting coefficient memory; and an adding circuit for adding the output of said multiplying circuit to the ink amount indicative signal of the color with respect to said surrounding picture element.

8. The system as set forth in claim 1, wherein:

said first color ink amount correction circuit includes:

first quantization means for inputting and quantizing a first color ink amount indicative signal having a relatively small influence upon luminance, with respect to a certain picture element;

first error calculating means for calculating a quantization error between the input and output of said first quantization means, and for outputting a first quantization error signal; and first feedback correction means for correcting said first color ink amount indicative signal with respect to a picture element surrounding said certain picture element, using said first quantization error signal;

said second color ink amount correction circuit includes:

second quantization means for inputting and quantizing a second color ink amount indicative signal having a relatively middle influence upon luminance, with respect to a certain picture element;

second error calculating means for calculating a quantization error between the input and output of said second quantization means, and for outputting a second quantization error signal;

second feedback correction means for correcting said second color ink amount indicative signal with respect to a picture element surrounding said certain picture element using said second quantization error signal; and said correction amount adding means adds said first quantization error signal derived with respect to said first color ink amount indicative signal to the output of said second feedback correction means, for correcting said second color ink amount indicative signal; and further comprising a third color ink amount correction circuit including:

third quantization means for inputting and quantizing a third color ink amount indicative signal having a relatively great influence upon luminance, with respect to a certain picture element;

a third error calculating means for calculating a quantization error between the input and output of said third quantization means, and for outputting a third quantization error signal;

third feedback correction means for correcting said third color ink amount indicative signal with respect to a picture element surrounding said certain picture element using said third quantization error signal; and second correction amount adding means for adding said first and second quantization error signals outputted from said first and second error calculating means to the output of said third feedback correction means, and for correcting said third color ink amount indicative signal.

9. The system as set forth in claim 8, wherein said first color ink amount correction circuit comprises a yellow ink amount correction circuit for correcting the amount of yellow ink having the minimum influence upon luminance, said second color ink amount correction circuit comprises a magenta ink amount correction circuit for correcting the amount of magenta ink having a greater influence upon luminance than said yellow ink, and said third color ink amount correction circuit comprises a cyanogen ink amount correction circuit for correcting the amount of cyanogen ink having a greater influence upon luminance than said magenta ink.

10. The system as set forth in claim 8, which further comprises a quantization error averaging circuit for calculating an average value of the value of said first quantization error signal outputted from said first error calculating means and the value of said second quantization error signal outputted from said second error calculating means, and for outputting the average value to said second correction amount adding means.

11. The system as set forth in claim 8, wherein each of said first, second and third feedback correction means comprises:

an error buffer for temporarily holding an error signal with respect to each of color inks supplied from said error calculating means;

a weighting coefficient memory for storing a weighting coefficient having been derived for each color in accordance with respective color inks;

a multiplying circuit for multiplying the error signal held in said error buffer, by said weighting coefficient which is stored in said weighting coefficient memory; and an adding circuit for adding the output of said multiplying circuit to the ink amount indicative signal of the color with respect to said surrounding picture element.

12. The system as set forth in claim 1, wherein:

said first color ink amount correction circuit includes:

first quantization means for inputting and quantizing a first color ink amount indicative signal having a relatively small influence upon luminance, with respect to a certain picture element;

first error calculating means for calculating a quantization error between the input and output of said first quantization means, and for outputting a first quantization error signal; and first feedback correction means for correcting said first color ink amount indicative signal with respect to a picture element surrounding said certain picture element, using said first quantization error signal;

said second color ink amount correction circuit includes:

second quantization means for inputting and quantizing a second color ink amount indicative signal having a greater influence upon luminance than said first color ink, with respect to a certain picture element;

second error calculating means for calculating a quantization error between the input and output of said second quantization means, and for outputting a second quantization error signal;

second feedback correction means for correcting said second color ink amount indicative signal with respect to a picture element surrounding said certain picture element, using said second quantization error signal; and said correction amount adding means adds said first quantization error signal derived with respect to said first color ink amount indicative signal to the output of said second feedback correction means, for correcting said second color ink amount indicative signal; and further comprising a third color ink amount correction circuit including:

third quantization means for inputting and quantizing a third color ink amount indicative signal having a greater influence upon luminance than said second color ink, with respect to a certain picture element;

third error calculating means for calculating a quantization error between the input and output of said third quantization means, and for outputting a third quantization error signal;

third feedback correction means for correcting said third color ink amount indicative signal with respect to a picture element surrounding said certain picture element, using said third quantization error signal; and second correction amount adding means for adding an average value of said first and second quantization error signals outputted from said first and second error calculating means to the output of said third feedback correction means, and for correcting said third color ink amount indicative signal; and a fourth color ink amount correction circuit including:

fourth quantization means for inputting and quantizing a fourth color ink amount indicative signal having a maximum influence upon luminance, with respect to a certain picture element;

fourth error calculating means for calculating a quantization error between the input and output of said fourth quantization means, and for outputting a fourth quantization error signal;

fourth feedback correction means for correcting said fourth color ink amount indicative signal with respect to a picture element surrounding said certain picture element, using said fourth quantization error signal; and third correction amount adding means for adding an average value of said first, second and third quantization error signals outputted from said first, second and third error calculating means to the output of said fourth feedback correction means, and for correcting said fourth color ink amount indicative signal.

13. The system as set forth in claim 12, wherein said first color ink amount correction circuit comprises a yellow ink amount correction circuit for correcting the amount of yellow ink having the minimum influence upon luminance, said second color ink amount correction circuit comprises a magenta ink amount correction circuit for correcting the amount of magenta ink having a greater influence upon luminance than said yellow ink, said third color ink amount correction circuit comprises a cyanogen ink, amount correction circuit for correcting the amount of cyanogen ink having a greater influence upon luminance than said magenta ink, and said fourth color ink amount correction circuit comprises a black ink amount correction circuit for correcting the amount of black ink having the maximum influence upon luminance.

14. The system as set forth in claim 12, which further comprises:

a first quantization error averaging circuit for calculating an average value of the values of said first quantization error signal outputted from said first error calculating means, of said second quantization error signal outputted from said second error calculating means, and of said third quantization error signal outputted from said third error calculating means, and for outputting the average value to said third correction amount adding means.

15. The system as set forth in claim 14, which further comprises:

a second quantization error averaging circuit for calculating an average value of the values of said first quantization error signal outputted from said first error calculating means and said second quantization error signal outputted from said second error calculating means, and for outputting the average value to said second correction amount adding means.

16. The system as set forth in claim 12, wherein each of said first, second, third and fourth feedback correction means comprises:

an error buffer for temporarily holding an error signal with respect to each of color inks supplied from error calculating means;

a weighting coefficient memory for storing a weighting coefficient having been derived for each of color in accordance with the respective color inks;

a multiplying circuit for multiplying the error signal held in said error buffer, by said weighting coefficient which is stored in said weighting coefficient memory; and an adding circuit for adding the output of said multiplying circuit to the Ink amount indicative signal of the color with respect to said surrounding picture element.

17. A color image printer system for printing a color image of good quality by means of error diffusion, said system comprising:

an input system for inputting a plurality of ink amount indicative signals which are representative of amounts of inks of a plurality of colors corresponding to a primary color image;

an ink amount correction system which comprises a plurality of correction circuits for correcting different color ink amount indicative signals, said correction circuits including a plurality of quantization means for quantizing said ink amount indicative signals, a plurality of error calculating means, each respectively deriving an error signal representative of a quantization error of a signal quantized by said plurality of quantization means, a plurality of error correction means for adding said error signal derived by said plurality of error calculating means to a corresponding ink amount indicative signal, a plurality of feedback correction means for adding, to an ink amount indicative signal inputted to at least one of said plurality of quantization means, an error signal derived by error calculating means in accordance with at least one ink amount indicative signal other than an ink amount indicative signal inputted to said at least one of said plurality of quantization means, and a correction amount adding means for quantizing a color ink amount having a greater influence upon luminance, and for adding a quantization error with respect to a color ink amount signal having a smaller influence upon luminance as a correction amount; and an output system for printing a color image using a plurality of color inks in accordance with the signals quantized by said plurality of quantization means.

18. The color image printer system as set forth in claim 17, wherein:

said input system respectively inputs a yellow ink amount indicative signal, a magenta ink amount indicative signal, a cyanogen ink amount indicative signal and a black ink amount indicative signal which are respectively the amounts of yellow, magenta, cyanogen and India inks corresponding to a certain picture element of a primary color image; and said ink amount correction system includes a plurality of quantization means for respectively quantizing said yellow ink amount indicative signal, said magenta ink amount indicative signal, said cyanogen ink amount indicative signal and said black ink amount indicative signal, a plurality of error calculating means, each deriving an error signal representative of a quantization error of a signal quantized by each of said plurality of quantization means, a plurality of feedback correction means, each adding said error signal derived by each of said plurality of error calculating means to a corresponding ink amount indicative signal with respect to a picture element surrounding said certain picture element, averaging means for deriving an average value of the error signals derived by error calculating means in accordance with said plurality of ink amount indicative signals, and adding means for adding said average value to the ink amount indicative signal inputted to a quantization means, the input of which is the ink amount indicative signal representative of the amount of black ink, out of said plurality of quantization means; and further comprising a printing system for printing a color image of yellow, magenta, cyanogen and India inks in accordance with the signals quantized by said plurality of quantization means.

19. The color image printer system as set forth in claim 17, wherein:

said input system inputs a plurality of ink amount indicative signals which are respectively the amounts of inks of a plurality of colors corresponding to a primary color image;

said ink amount correction system includes a plurality of quantization means for quantizing said plurality of ink amount indicative signals with respect to a certain picture element, a plurality of error calculating means, each deriving an error signal representative of a quantization error of a signal quantized by each of said plurality of quantization means, feedback correction means for supplying said error signals derived by said plurality of error calculating means to a corresponding ink amount indicative signal with respect to a picture element surrounding a certain picture element, for correcting said ink amount indicative signal, and correction amount adding means for adding, to an ink amount indicative signal inputted to at least one of said plurality of quantization means, the error signal derived by an error calculating means in accordance with the ink amount indicative signal representative of the amount of an ink of a color having a smaller influence upon luminance than the color represented by the ink amount indicative signal; and further comprising a printing system for printing a color image of inks of a plurality of colors, in accordance with signals quantized by said plurality of quantization means.

20. The color image printer system as set forth in claim 17, wherein said correction amount adding means is provided on the input side of the corresponding quantization means, and error calculating means derives, as said error signal, a differential signal between the ink amount indicative signal and the ink amount indicative signal quantized by said quantization means.

* * * * *